METHOD FOR SEALING ELECTRICAL SWITCHES OR THE LIKE

Filed Jan. 20, 1956

INVENTORS
MARK L. BEARDSLEE
WALTER N. FRANK
JAMES L. STONE
BY John T. Marvin
his ATTORNEY United States Patent Office 2,955,327

Patented Oct. 11, 1960

2,955,327

METHOD FOR SEALING ELECTRICAL SWITCHES OR THE LIKE

Mark L. Beardslee and Walter N. Frank, Detroit, and James L. Stone, Taylor Center, Mich., assignors to General Motors Corporation, Detroit, Mich., a corporation of Delaware Filed Jan. 20, 1956, Ser. No. 560,340

2 Claims. (Cl. 18—59)

This invention relates to a method of hermetically sealing electrical switches, relays and the like.

In some applications of electrical devices such as electrical switches and the like, it is necessary that the devices be exposed to water, dust and corrosive substances under relatively severe conditions which cause such devices to become inoperative. In some instances, as for example, in connection with military equipment, electrical devices must under certain operating conditions be submerged in water, and it is required that the devices be water-proof even under pressures of several pounds. Various electrical devices have been constructed with water-proof casings to meet the various operating conditions. However, such devices in addition to being relatively costly frequently require that the equipment in which they are to be installed be specially designed to accommodate the added bulk of the devices.

It is an object of the present invention to provide a method of hermetically sealing electrical switches, relays and like devices which includes first applying a layer of plastic material at the cracks and crevices of the device housing through which water, dirt and other deleterious matter may normally enter into the operating mechanism. This plastic material is of a character that it will in an uncured state flow into and dam the cracks and crevices and not enter into the operating mechanism of the article to destroy the functional properties thereof and which in a cured state will bond to the device and form a tough, semi-hard plastic seal to render the article air-tight. The process further includes applying a coating of epoxy resin plastic material to the device and over the layer of damming material, which is compatible with the damming material and which will bond to the surface of the device and together with the damming material provide a seal with the desired mechanical strength and resistance to the heat to which the device is exposed.

A further object of the invention is to provide a method of hermetically sealing electrical switches and relays and the like device which includes sealing the cracks and crevices of the device, through which deleterious material may enter, with a sealing or damming material which is essentially a mixture of Thiokol, epoxy resin, filler, and curing agent wherein the filler is of a character capable of rendering the composition thixotropic and which will control the flow characteristics of the compound in the ungelled or uncured condition, bonding the damming material to the device to render the device air-tight by curing the same and thereafter molding over the device and damming material an epoxy resin coating to provide the device with a seal having high mechanical strength and heat resistance.

Further objects and advantages of the present invention will be apparent from the following description, reference being had to the accompanying drawings wherein a preferred form of the invention is clearly shown.

Figures 1, 2, 3:
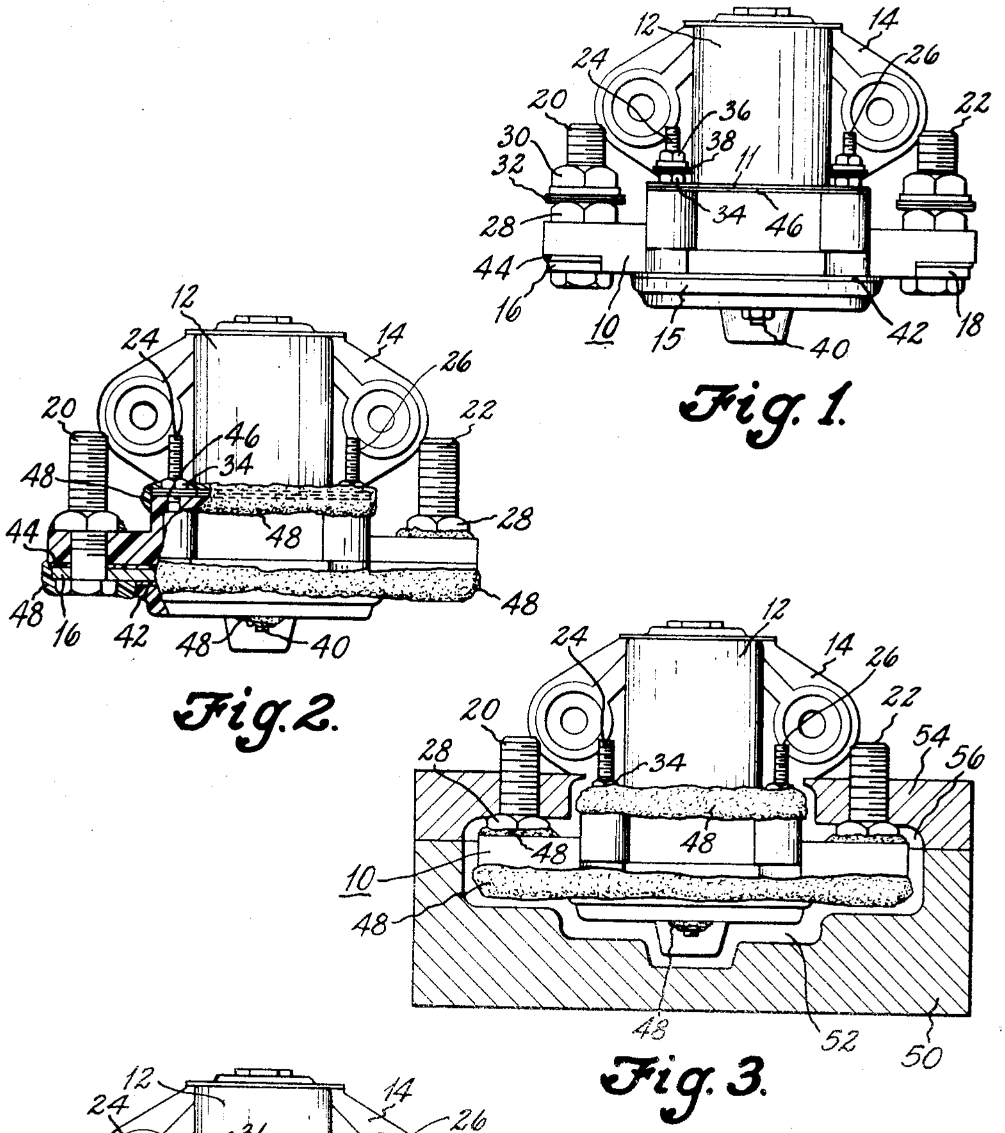
Figure 1 is a side elevation of an electrical relay.
Figure 2 is a side elevation of a relay having damming material applied to a portion thereof and having a portion thereof shown in cross section.
Figure 3 is the relay positioned in a mold.

The method of the present invention will now be described in terms of hermetically sealing or water-proofing a specific electrical device although it will be obvious that the method is of general application. Referring to the drawings, Figure 1 illustrates a commercial solenoid relay which includes a housing portion 10, housing top portion 11, solenoid coil can 12, mounting bracket 14, base portion 15, lead terminal bars 16 and 18, lead terminal studs 20 and 22 and coil lead studs 24 and 26. Stud 20 cooperates with nut 28 to hold terminal bar 16 secured to housing 10, and nut 30 and washers 32 cooperate with stud 20 to secure a lead thereto. Similarly stud 24 cooperates with nut 34 to hold the top portion 11 secured to housing portion 10, and nut 36 and washers 38 cooperate with stud 24 to secure a coil lead thereto. Studs 22 and 26 have nuts and washers corresponding to those associated with studs 20 and 24 respectively. Bolt 40 holds the base 15 secured to housing member 10.

As seen in Figure 1, gasket 42 is provided between base 15 and housing 10, gasket 44 is provided between terminal contact bars 16 and 18 and housing 10, and gasket 46 is provided between housing 10 and top portion 11, to effect a seal between the parts. The seals afforded by the aforementioned gaskets are adequate to prevent entry of deleterious material into the relay mechanism under conditions of normal usage. However, these seals are not adequate to protect the relay mechanism under severe conditions, as for example when the relay is submerged in water. Further, the spaces between studs and nuts such as 20 and 24 and nuts 28 and 34, and the housing members also may permit entry of deleterious material into the relay mechanism under severe conditions of usage.

To hermetically seal the relay in accordance with the present invention, relay parts such as nuts 30 and 36 and washers 32 and 38 are removed. The outer relay housing parts are then cleaned with a ketone cleaner such as acetone or methyl ethyl ketone to remove contaminates and lacquers and are air dried.

After the cleaning operation, the portions of the relay above indicated through which liquids, gases or other deleterious material may enter into the relay mechanism are sealed. This is accomplished by applying to these portions a damming agent. A suitable material for this purpose is a commercial product known as Nureco Casting Agent 102 AF/90" which is a mixture of two materials identified as A and B. Material A is basically Thiokol, a filler and a curing agent. Material B is basically an epoxy resin and a filler. In formulating the damming agent two parts of material A are intimately mixed with one part B. The curing agent in component A is added for curing the epoxy resin of compound B, a suitable example of which is metaphenylene diamine. The fillers in both components are preferably of a character which will render the composition thixotropic and thereby control the flow characteristics of the damming agent in an uncured condition. When the materials A and B are mixed the resultant product should be of such a consistency so that it will dam all cracks and crevices and not enter into the relay mechanism and destroy the relay's functional properties. To attain the desired consistency, the damming agent may be diluted by a ketone such as acetone or other suitable vehicle. Preferably the filler is of an extremely fine mesh so as to give stable suspensions in the vehicle used. Examples of suitable fillers include silica gels such as the commercial product Santo Cel 54 of the Monsanto Chemical Company and synthetic silica of the Davidson Chemical Company. The amount of filler used in the damming agent depends on the vehicle used and the desired viscosity of the final mixture. The percentage used is based on the bulking density of the filler. Thus if Santo Cel is used as a filler, component A of the mixture would require from 10 to 15% Santo Cel by weight of the Thiokol used, and component B would require 10 to 15% by weight of the epoxy resin used. The Thiokol referred to is a polysulfide rubber which may be obtained by heating polysulfide with ethylene dichloride or dichloroethylether and suitably compounded as is well known in the art.

A suitable recipe for the damming agent is as follows:

| | Parts by weight |
|---|---|
| Epon Resin 828 (Shell Chem. Co.) | 100 |
| Thiokol LP3 (Thiokol Chem. Co.) | 100 |
| Santo Cel 54 (Monsanto Chem. Co.) | 20 |
| Metaphenylene diamine | 20 |

As described above, when the constituents of the damming agent are mixed the resultant product should be of such a consistency so that it will dam all cracks and crevices and not enter into the relay mechanism so as to destroy the relay's functional properties. Accordingly, it is applied in paste form to relatively large cracks and crevices since in that form it will not enter the relay mechanism. The uncured resin mixture may be diluted with a ketone such as acetone to render the mixture less viscous whereby it may be applied, as by brushing, to relatively small cracks and crevices so as to flow into and seal such openings. The thixotropic character of the filler functions to provide the damming material with a thixotropic character and to set and prevent the flow thereof into the relay mechanism. Figure 2 shows the damming material 48 applied at the various housing points exemplified by gaskets 42, 44 and 46, over terminal bars 16 and 18 and around the various studs and nuts which provide parts of entry of foreign material into the relay mechanism.

After the damming material has been applied, it is permitted to cure at room temperatures for about 24 hours. The cured product bonds to the various parts to which it is applied including the various metals and non-metallic material of which the electrical device may be composed and forms a tough, semi-hard substance which is effective in rendering the device air-tight. The Thiokol imparts a desired flexibility to the substance especially at sub-zero temperatures. The device is then air tested for leaks and the damming material is reapplied if necessary until the relay is air-tight. Although the damming material is effective in rendering the relay air-tight, it is incapable of withstanding the high and low temperature and pressures to which the relay may be exposed in use.

To enable the seal described above to withstand the temperature and pressures to which the relay may be exposed, the relay, including all of the dammed or seal portions, are coated with a protective covering which is compatible with the damming material and which will bond securely to the various portions of the relay to which it is applied. To this end a layer of epoxy resin is molded about the relay. Before the molding process, the dammed relay is cleaned with a ketone such as methyl ethyl ketone or acetone as for example by dipping. Ketones have very little solvent action on the damming material or the final epoxy resin coating in a cured state and accordingly are well suited for this purpose. After the damming step, the relay is then placed in an open face mold as shown in Figure 3 which includes a drag 50 having a lower cavity 52 and a cope 54 having an upper cavity 54. Cope 54 has an opening therein through which coil can 12 of the relay projects when the relay is positioned in the mold. A backing bar (not shown) positioned adjacent the rear side of the lower cavity 56, has a vertical wall which rises above the plane of the drag. This vertical wall has a recess for receiving a portion of bracket 14 of the relay and holds the relay positioned in the mold and controls the flow of resin between the relay coil can and the mounting bracket and between the relay housing and the mounting bracket during the molding operation. In application of the present method the mold is preferably designed to provide a continuous coating of resin of approximately 1/8" about the parts of the electrical devices which are to be protected although the thickness of the coating may be varied in accordance with the end result desired.

Suitable casting epoxy resin coating recipes for the present purposes may be made up in the following preferred ranges:

| | Parts by weight |
|---|---|
| Epoxy resin | 100 |
| Silica (325 mesh) | 140 to 280 |
| Styrene oxide | 10 to 25 |
| Cold-pressed castor oil | 20 to 40 |
| Metaphenylene diamine | 20 ± 1 |

A specific preferred recipe is as follows:

| | Parts by weight |
|---|---|
| Epon Resin 828 | 100 |
| Styrene oxide | 23 |
| Cold-pressed castor oil | 40 |
| Silica (325 mesh) | 140 |

Silica 325 mesh is the preferred filler for the present purpose. However, other materials such as sand, slate, porcelain powder or powdered glass may be substituted for the silica, provided that the material has approximately a 325 mesh. The Epon resin 828 of the Shell Oil Company is a condensation polymer derived from the primary reaction of epichlorohydrin with bisphenol. However, any of the epoxy resins in the lower molecular weight series could be used in formulating the epoxy resin coating. The recipe may be varied within the above ranges as desired to produce a desired end product. It is only necessary to maintain the ratio of metaphenylene diamine to epoxy resin approximately constant. The epoxy resins of the lower molecular weight series above indicated are those which may be represented by the following formula:

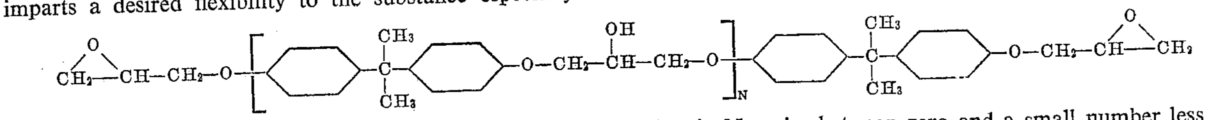

Wherein N varies between zero and a small number less than 10. Preferably the epoxy resin used in both the damming agent and the final coating has an N value equivalent to approximately 0.1.

In molding the epoxy resin coating onto the relay, the mold cavity is preferably preheated, the relay is inserted therein and the molding mixture is poured into the mold to a proper level at temperatures ranging between 150° to 175° F. The resin is then cured in a furnace for about 2½ hours at about 175° F. After the mold is removed from the oven the resin is partially plastic or soft and it may then be converted into a thermoset condition by air cooling or preferably by water quenching to hasten the thermosetting process.

In order that the coated relay will readily part from the mold, the mold cavity is preferably coated with a mold release agent. A suitable mold release agent for the present purpose is a mixture of an ammonium salt of an alkyl acid phosphate and a silicone-water emulsion wherein a mixture of 100 millimeters contains about 0.8 gram of the salt and about 2 milliliters of the emulsion containing about 25% silicone. The release agent may be applied cold to the preheated mold.

Figure 4:
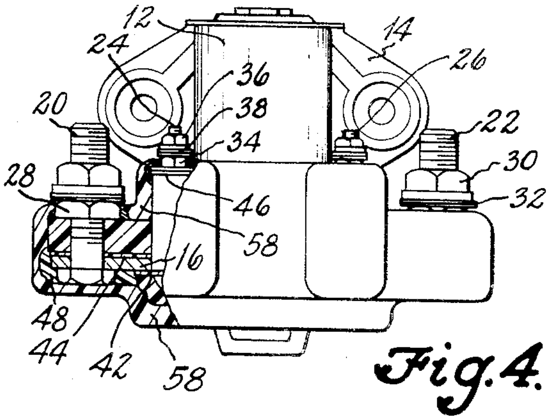
Figure 4 is a relay having damming or sealing material applied to portions thereof and a protective coating molded thereon.

As shown in Figure 4, the epoxy resin coating 58 overlays the damming material 48 and is bonded thereto. It further coats or overlays the remaining portions of the relay housing and is bonded securely thereto. The resultant relay is air-tight due to the damming material 48 and has high mechanical strength and resistance to temperatures due to the final epoxy resin coating. It is essential to the present process that both the damming material and final coating involve an epoxy base resin. Other non-epoxy resins, synthetic rubbers and lacquers have been found incapable of producing a desired end product.

While the form of embodiment of the invention as herein disclosed constitutes a preferred form, it is to be understood that other forms might be adopted, as may come within the scope of the claims which follow.

What is claimed is as follows:

1. In a method for hermetically sealing the external joints, cracks and crevices of the housing of switches, relays and like electrical devices, the steps including cleaning the external portions of the device housing, mechanically working a damming material into said joints, cracks and crevices for filling said joints, cracks and crevices with a said damming material capable on curing of forming a hermetic seal, comprising a tough resilient semi-hard substance consisting essentially of an epoxy resin, a polysulphide polymer, an amine type catalyst and a filler capable of rendering the said material thixotropic, said material being of a paste-like consistency for damming relatively large cracks and crevices and of a flowable consistency for filling relatively small cracks and crevices without flowing into the device mechanism, curing said damming material in place for forming a tough resilient semi-hard substance bonded to the device to render it air tight, then molding a continuous protective coating compatible with said damming material over said housing in a preheated mold, said coating consisting essentially of a curable epoxy resin and curing said protective coating whereby it is bonded to said housing and damming material and formed into a coating of high mechanical strength and heat resistance.

2. In a method for hermetically sealing external joints, cracks and crevices of the housing of switches and relays, the steps comprising mechanically applying to the housing joints, cracks and crevices a thixotropic damming material capable of forming a tough resilient semi-hard substance consisting essentially of an epoxy resin, a polysulfide polymer, and a filler, said thixotropic material having a consistency capable of filling and hermetically sealing said joints, cracks and crevices of said housing, and incapable of flowing into said device mechanism, curing said applied damming material in place, molding over said housing and damming materials continuous protective coating consisting essentially of an epoxy resin which is compatible with said damming material, and curing said protective coating.

References Cited in the file of this patent

UNITED STATES PATENTS

| | | |
|---|---|---|
| 2,414,320 | Miller | Jan. 14, 1947 |
| 2,414,525 | Hill et al. | Jan. 21, 1947 |
| 2,459,018 | De Monte | Jan. 11, 1949 |
| 2,597,338 | Kohring | May 20, 1950 |
| 2,681,398 | Kozacka et al. | June 15, 1954 |
| 2,701,392 | Eich | Feb. 8, 1955 |
| 2,743,309 | Lindsay | Apr. 24, 1956 |
| 2,785,383 | Foster | Mar. 12, 1957 |
| 2,795,009 | Gosnell et al. | June 11, 1957 |

FOREIGN PATENTS

| | | |
|---|---|---|
| 416,735 | Great Britain | Sept. 20, 1934 |

OTHER REFERENCES

Jorczak: "Liquid Polymers Coupled with Epoxy Resins," Rubber World, April 1954, pages 66–69.

Charlton: "Alloying Unit Epoxies," Modern Plastics, September 1954, pages 155–157, 160, 161, 240, 241, 242, 243.

Jorczak: "Synthetic Rubber Epoxy Elastomeric Compounds," Electrical Manufacturing, December 1952, page 10.